(12) United States Patent
Golden

(10) Patent No.: US 7,510,146 B2
(45) Date of Patent: Mar. 31, 2009

(54) WINDOW SHADE SYSTEM AND METHOD OF USE

(76) Inventor: Robert Golden, 8376 Belize Pl., Wellington, FL (US) 33414

(*) Notice: Subject to any disclaimer, the term of this patent is extended or adjusted under 35 U.S.C. 154(b) by 99 days.

(21) Appl. No.: 11/007,640

(22) Filed: Dec. 8, 2004

(65) Prior Publication Data

US 2006/0061118 A1    Mar. 23, 2006

(51) Int. Cl.
*B64C 1/14* (2006.01)
(52) U.S. Cl. ............... 244/129.3; 296/97.11; 296/97.4; 49/324
(58) Field of Classification Search ............ 244/129.3, 244/129.4, 118.5, 121; 160/208, 90; 296/97.1, 296/97.4, 97.11; 49/324, 357, 326; D25/53; 297/97.1, 97.4, 97.11
See application file for complete search history.

(56) References Cited

U.S. PATENT DOCUMENTS

| | | | | |
|---|---|---|---|---|
| 3,691,686 A * | 9/1972 | Donegan | ..................... | 49/56 |
| 3,906,669 A * | 9/1975 | Vorguitch | ................... | 49/372 |
| 4,364,533 A * | 12/1982 | Pompei et al. | ........... | 244/129.3 |
| 4,679,610 A * | 7/1987 | Spraggins | ................... | 160/107 |
| 6,170,899 B1 * | 1/2001 | Corn | ......................... | 296/97.4 |
| 6,186,211 B1 * | 2/2001 | Knowles | ................. | 160/84.02 |
| 6,227,491 B1 * | 5/2001 | Stephan et al. | ........... | 244/129.3 |
| 6,460,805 B1 * | 10/2002 | Sanz et al. | ............... | 244/129.3 |
| 6,758,255 B2 * | 7/2004 | Sanz et al. | ............... | 160/84.06 |
| 6,832,641 B1 * | 12/2004 | Sanz et al. | ..................... | 160/90 |
| 6,915,988 B2 * | 7/2005 | Sanz et al. | ............... | 244/129.3 |
| 6,917,167 B2 * | 7/2005 | Courtney et al. | ............ | 315/318 |
| 2003/0192991 A1 * | 10/2003 | Rukavina et al. | ......... | 244/129.3 |
| 2005/0263254 A1 * | 12/2005 | Sievers et al. | ................. | 160/90 |

* cited by examiner

*Primary Examiner*—Bret Hayes
*Assistant Examiner*—Benjamin P Lee

(57) ABSTRACT

An improved window shade system, thought to be most beneficial in the Aviation and mass transit context. This system has a series of individual window shade units, each having a multilayer shade configuration. Such multilayer shade configuration provides for a great degree of control with regard to the amount of incidental light actually allowed to enter a passenger compartment. Further, each individual window shade unit is fully automated and may be linked to an adjacent window shade unit in a daisy chain fashion. This system presents novel features in the window shade itself, within the electronic components that operate the window shade, and the relationship between the system and its operators.

23 Claims, 8 Drawing Sheets

WINDOW SHADE SYSTEM AND METHOD OF USE

BACKGROUND OF THE INVENTION

1. Field of the Invention

The present invention generally relates to an improved window shade system primarily for use in mass transit vehicles such as commercial and larger general aviation aircraft vehicles. More specifically, the invention relates to an improved window shade system comprised of a series of individual window shade units each configured to have multilayer semi-ridged shade panel members. Further, each window shade unit is electronically controlled by its control module by inputs from the user (passenger) or from one or more central attendant input stations. The invention is extremely beneficial in terms of ease of use, ease of replacement or repair, durability, and the control afforded to both user (passenger) and attendants.

2. Background Information

In the thousands of passenger airplanes and other mass transit vehicles, no doubt here are a countless number of windows within these vehicles. And, despite their great number, almost all of these windows are of the same basic, generic configuration. That is, each window unit is comprised of some inner or first surface meant to separate the actual window and the passenger compartment. This first surface is usually referred to as a "scratch surface," or "scratch lens." As the name implies, not only is this surface meant to separate the actual window and the passenger, but serves to bear the brunt of damages from interaction with the passengers themselves. The window unit also has, of course, the outer surface. This surface is seated within the body of the vehicle and provides passengers their only means for viewing their surrounding environment. When it comes to the amount of incident light that is allowed to actually enter the passenger compartment, these window units offer only a rudimentary "all or nothing" alternative. That is, if a passenger wants to be able to control the amount of light, or the degree to which he may view his surroundings, he is limited to use of a single shade panel. This shade panel, by sliding between an "open", position, or a "closed" position provides the only means for adjusting the amount of light received within the passenger compartment. Further, adjusting the position of each shade requires the passenger to have physical access to the window unit to manually lift or lower the shade panel. This task, seemingly a minor one may be difficult or impossible because of conditions upon the vehicle. A passenger's ability to reach a window unit to enable adjustment can also be restricted by "fasten seat belt" notices, turbulence or rough ride conditions. Moreover, while the task may seem trivial to the majority, it can be difficult or impossible for the young, disabled, or elderly passengers.

From a reliability and maintenance stand point, known window shade units are a hassle. They are unreliable and prone to failure, because these window units are manually adjusted they are subjected to abuse and severe ware conditions, often binding, dropping to there "closed" position and breaking. Maintenance is also difficult, specifically, such units are very difficult to repair as such requires complete removal of the entire window unit and sidewall panel to grant access to the shade mechanism. In light of the above, the general configuration of window shade units known in the art present a number of limitations that are overcome by Applicant's invention.

SUMMARY OF THE INVENTION

In view of the forgoing, it is an object of the present invention to provide an improved window shade system that affords its user a greater degree of control in its operation.

It is another object of the present invention to provide an improved window shade system that employs a dual semi-rigid shade panel combination.

It is another object of the present invention to provide an improved window shade system having a controller module that is capable of down stream linking "daisy chain" to other shade modules.

It is another object of the present invention to provide an improved window shade system that eliminates the need for a centralized cabin management system to interface with the shade units to provide desired functionality.

It is another object of the present invention to provide an improved window shade system that permits the shade system unit to interface and work seamlessly with a cabin management interfaced vehicle.

It is another object of the present invention to provide an improved window shade system that has a stable reliable motor drive assembly.

It is another object of the present invention to provide an improved window shade system that is fully automated.

It is another object of the present invention to provide an improved window shade system that easily replaces existing, in place manual and electric window shade units.

It is another object of the present invention to provide an improved window shade system that has a straightforward repair and replacement process.

It is another object of the present invention to provide an improved window shade system that has an exceptionally long service life.

It is another object of the present invention to provide an improved window shade system that requires relatively very low maintenance.

It is another object of the present invention to provide an improved window shade system that is highly water resistant.

In satisfaction of these and other related objectives, Applicant's invention provides an improved window shade system comprised of a series of individual window shade units and control modules having the ability to down stream link without the need of a cabin management computerized system or other networking device. The system in configured so that each window shade unit and control module is capable of receiving and responding to both user "passenger" and attendant input signals, without limit to the number of input devices per window shade unit.

By virtue of a novel combination of a translucent semi-ridged shade panel and a semi-ridged opaque shade panel, embedded within a frame, and in combination with a unique drive mechanism, the present invention obviates problems associated with known window shade units. First and foremost, the present invention allows its user a level of control with regard to the amount of incident light reaching the passenger compartment not possible with known products. As the dual-layer combination of shade panels may be manipulated between open and closed positions and any combination there between, the system affords its user total control over the amount of incidental light actually entering the passenger compartment. Also the design of the drive mechanism assures that the shade panels are locked into place so that they do not drift or move from their desired position. As such, system users do not have to continuously adjust or re-adjust the shades to maintain the desired amount of light entering the compartment.

Aside from the configuration of the shade apparatus itself, one of the most novel features of the current system is the "daisy chain" downstream linking ability of the individual shade unit's controller module. That is to say that the individual shade controller module is capable of linking to the next downstream shade controller module. This feature permits individual shade units to function in associated groupings, in this configuration one passenger via one input device "switches" could cause multiple shade units to function as one. That is, each window shade unit has its own shade controller module. This control module causes the drive mechanism to operate and send the shade panels to their desired positions. The controller can be sent operational signals from two sources: 1) user "passenger" and 2) attendant each of these input sources are independent from each other. The user "passenger" input is provided to the window shade unit via "open" and "close" momentary switches. When the controller receives an open input signal it will cause the shade apparatus to send the shade panels to their open position.

The controller will cause a drive mechanism to send the opaque shade panel to its open position, once the opaque panel is in the full open position; the controller will then cause the other drive mechanism to send the translucent shade to its full open position. The user "passenger" has the ability to stop the shade panel movements at any desired position. In a like manner the "close" switch sends the shade panels to their closed positions in the reverse order, translucent panel first then Opaque, again the user can stop the shade panels at any position he wishes. The user "passenger" input device is used to control one window or a group of associated window via the "daisy chain" ability of the controller board. If desired the controller module is capable of having more then one user input source thus providing the convenience of multiple switch locations.

The controller module has the capability of an independent attendant input signal as well. The attendant inputs cause each individual shade unit to perform the same function regardless of user inputs. For example, the attendant functions can be used to control all shade units in a vehicle or a grouping of windows in a section of a vehicle. Additionally, there can be more then one attendant input device location through out the vehicle. There are four functions that can be controlled from an attendants input station. "Open" all shades to their full open position, "Close" all shades to their full closed position, "Sheer mode" position all shade so that the transparent shade is to the full closed position and the opaque shades to its full open position. A fourth control command is to block out user Passenger inputs from superseding the attendant commands. Perhaps most importantly, the present system provides this exceptional control and functionality without the need of a computerized cabin management system. However each controller can be used as an independent controller and will function with any cabin management system or network.

Another unique feature of the present window shade unit is the controller's ability to interface with an onboard maintenance network and computer to advise maintenance issues such as normal maintenance needs a well as component failures and potential failures so that maintenance issues can be scheduled and potential failures prevented.

As mentioned, the present invention is very durable and provides for a relatively straightforward repair or replacement process. In fact the system is thought to have an independent operating life of 250,000 cycles before replacement need be performed. Similar to devices known in the art, the apparatus is protected by a scratch lens. However, unlike devices known to the art, Applicant's invention provides components parts that are connected to one another sealed to withstand emergencies. For instance, the present system is able to withstand violent impacts and submersion in water. This system is equipped with a stable drive mechanism that provides for reliable and repeatable automated shade adjustments. These features alone and in combination with one another, set the present invention apart from any device known in the art.

Further, this system can be configured to fit within an existing airliner window envelope; as such, the apparatus may directly replace existing manual shade units. Also, because the shade apparatus fits within a window envelope, maintenance may be performed without the need to remove any vehicle sidewall panels or interior structures. Because the drive mechanism (comprised of apparatus electronic and mechanical components) is compactly arranged with respect to the shade frame, the drive mechanism may be serviced or replaced without the need to remove the entire apparatus or the surrounding sidewall panels. Once again this provides significant advantages with regards to repair costs, inspection and replacement, and vehicle downtime.

As will be further discussed in the specifications to follow, Applicant's invention features a number of innovations that set it apart from the known systems. These innovations include a fault detection and failsafe protocol incorporated into each individual window shade unit. That is, in the event of an abnormal or erratic system behavior or some other irregularity the system will automatically revert into a "safe mode." Also each controller module and individual unit motor assemblies are effectively sealed from its surrounding environment. This feature allows the system to operate in the event the vehicle itself undergoes some problem or emergency. Finally, the present system has the ability to conduct self tests and evaluate its own operating capabilities and functions. The result of these self-tests can also be recorded and sent via a maintenance interface to an onboard or remote computer or other interface "black box." In view of the limitations of known products, there is a great need for an improved window shade that is automated, provides greater user control, is durable, and mechanically efficient. Applicant's invention by its novel design and straightforward installation and repair process, provides an improved replacement for currently available products.

Each individual window shade unit has a frame, comprised of two vertical guide rails that are separated, and held affixed with respect to one another, by an upper and lower horizontal spacer. A series of shade panels with rack gear edges engage the frame along corresponding guide slots located along the inner face of the frame rails. This frame structure is affixed to a sidewall panel or other suitable structure of the aircraft or other mass transit vehicle. That is, the ridged frame assembly is bracketed between the interior sidewall panel of the vehicle and the inner surface of the window and inner side of the aircraft or vehicle.

A drive mechanism, a simple rack and pinion design is attached to each vertical guide rail component of the frame. A pair of horizontal shafts, each having two pinions that mesh with a series of corresponding rack gears, the rack gears are affixed to the translucent and Opaque shade panels, travel within the slots of the vertical frame rails. This simple rack and pinion methodology provides for both a method to raise and lower the shade panels but also assures proper registration of the shade panels preventing binding and parallel shade panel alignment. The drive mechanism and corresponding shafts interact through a series of gears whereby rotation of the drive mechanism cause a corresponding rotation of the shafts. Each drive mechanism is "wired into the system", so that both shade panel members are regulated by one window shade unit control module.

Within the frame is a pair of shade panel members (an opaque member and a translucent member), arranged in multi-layer fashion. A scratch lens lies inboard and adjacent to said frame components. The scratch lens is meant to seal other apparatus components from the passenger compartment.

Sandwiched between the shade frame itself, adjacent to the scratch lens is an opaque panel member and a translucent panel member. When a user "passenger", control input is received by the controller module these shade members work in sequence. When the control module receives an input command from the attendant the shade members move simultaneously. The Translucent shade panel member may be covered with a variety of sheer fabrics and the like or may be coated, dyed or frosted to provide the desired amount of light diffusion effect desired. The opaque member may be upholstered or painted to provide the desired interior look and finish. Particular embodiments of the present invention are envisioned where the opaque panel member hosts a flexible circuit having light emitting diodes to display various themes or logos along the passenger compartment. Ultimately, the translucent panel member is a light diffusing member and the opaque panel member is meant to "blackout" incoming light.

Individual window shade unit control modules can be accessed for removal or replacement through the vehicle sidewall panel, or some other particular location. These modules connected with each individual units through standard wiring sequences and may receive an operators (passenger or attendant) input from multiple locations. These control modules are responsible for the movement of both shade panel members. For instance, when the control module receives a "close" input from a user "passenger" the module will begin to lower the inboard (translucent) shade panel member until it is completely closed. After a brief, predetermined time, the control module will cause the second (opaque) shade panel member to move until it is fully closed. If the "close" command is interrupted, all movement will cease until another command is sent to the control module. In a like manner when the control module receives an "open" input from a user "passenger" the module will begin to raise the outboard (opaque) shade panel member until it is completely open. After a brief, predetermined time, the control module will cause the second (Translucent) shade panel member to move until it is fully open. If the "open" command is interrupted, all movement will cease until another command is sent to the control module.

These individual control modules may also receive an "attendant" input. When an attendant input is received, it will override any "passenger" input being processed. An attendant input will cause the apparatus to proceed to one of four configurations: Fully "open" (where both the opaque panel member and the translucent panel member are sent simultaneously to their full "open" positions, Fully "closed" (where both the opaque panel member and the translucent panel member are sent simultaneously to their full "Closed" positions, or "sheer mode" in this configuration the opaque panel member is in the full "open" position and the translucent shade panel member is in the full "closed" position. The forth attendant command,"passenger lock-out" is the ability, if an attendant wishes to prevent the passengers from re-configuring the individual shades unit, the attendant can "lock-out" the passenger input capabilities. When an attendant input is received requiring the shade system unit to relocate the shade panel members the panel members move simultaneously not sequentially thus shortening the time required to reach the desired shade panel member configuration. As mentioned, individual unit modules may be associated with the next down stream window module by selecting the "daisy chain" "on" position on the upstream controller module; in this manner one passenger input device can control multiple window shade units. One control module becomes capable of communicating with an adjoining window shade unit and in this manner associate multiple shade units with one "passenger" command. As such, multiple window shade units are capable as functioning as one. The control module within each window shade unit performs several system functions. For instance, each control module determines the position of the shade panel members and the proper functioning of each shade panel member. Further, in the preferred embodiment, each control module contains a microchip that is programmed to detect failures in shade panel members function. When such a failure is detected, the microchip causes power to the associated drive mechanism to be cut-off. The control module also monitors the shade system for proper voltages and currents. In the event the control module detects abnormalities in voltage or current the power is cut-off. Moreover, the microchip is programmed to monitor shade unit operations and make repair assessments ant track maintenance intervals. Finally, in its most preferred form, each control module is able to interface with vehicle onboard maintenance computers or networks and to report abnormalities and or maintenance issues to the centralized maintenance computer.

BRIEF DESCRIPTION OF THE DRAWINGS

Applicant's invention may be further understood from a description of the accompanying drawings, wherein unless otherwise specified, like referenced numeral are intended to depict like components in various views.

DETAILED DESCRIPTION OF THE PREFERRED EMBODIMENT

Figure 1:
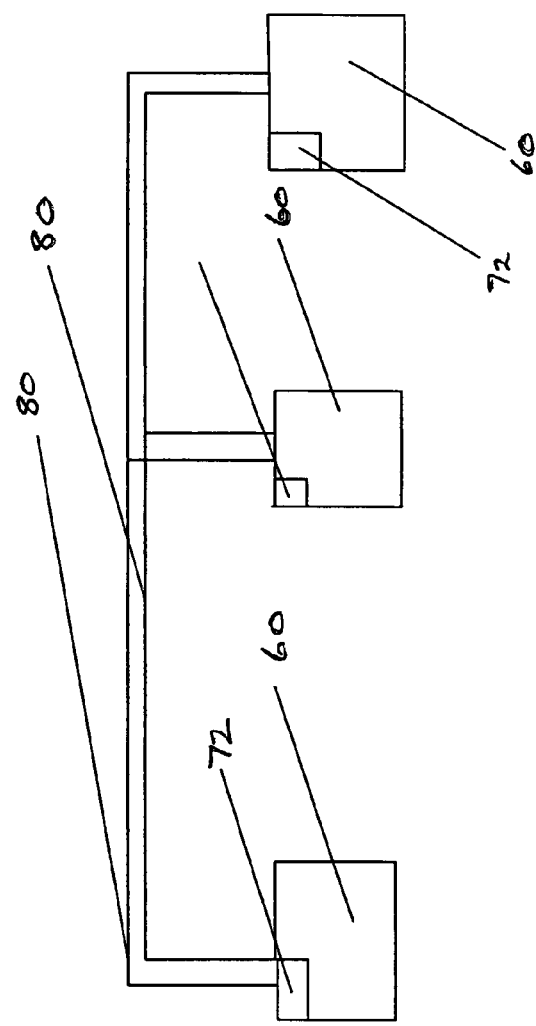
FIG. 1 is a schematic diagram of the system of the present invention.
Figure 2:
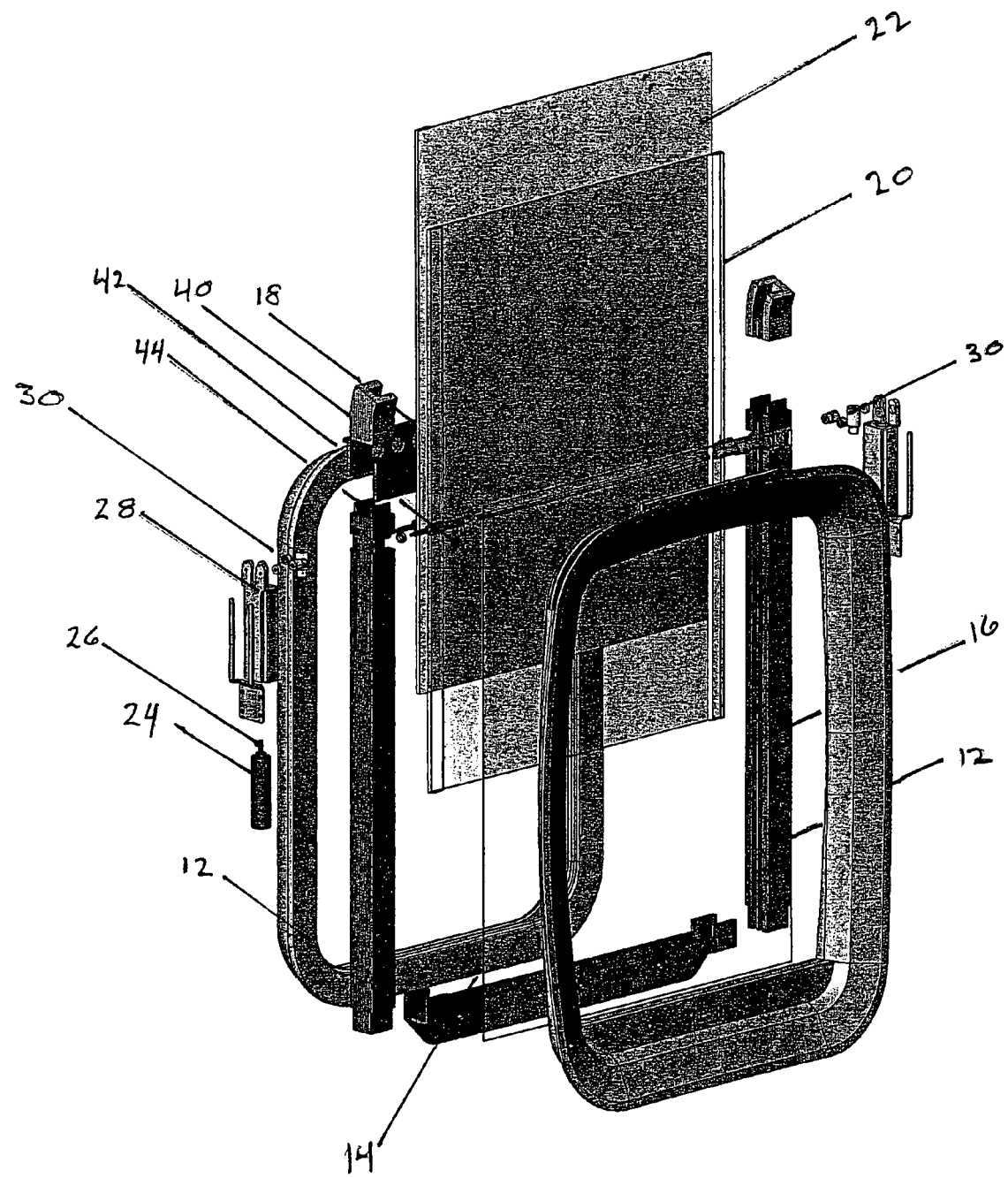
FIG. 2 is an exploded view of an individual window shade unit of the present invention.

With reference to FIG. 1, the improved window shade system (system) of the present invention is identified generally by the reference numeral 10. System 10, in its preferred embodiment, is thought to be most beneficial in the context of mass transit vehicles. An individual window shade unit configured for installation in an aircraft, such as a Boeing airliner, is depicted in FIG. 2. In the preferred embodiment, each window shade unit of system 10 contains vertical support members 12. Vertical support members 12 are separated and held in relation to one another by lower horizontal member 14 and upper horizontal member 18. In the preferred embodiment lower horizontal member 14 is configured to support translucent member 20 and Opaque member 22, while upper member 18 is configured to allow translucent member 20 and opaque member 22 to slide past member 18 between an open (top) position and closed (bottom) position. Vertical support members 12 further contains a series of groves 16 along their inner face. Each grove 16 receives and holds a corresponding shade panel member fitted with gear racks on each side (translucent member 20 and Opaque member 22)within the frame formed by the combination of vertical members 12 and lower horizontal member 14 and upper horizontal member 18. In the preferred embodiment, translucent shade panel member 20 and opaque member 22 are adjacently aligned in multi-layer fashion, and slide within groves 16. Translucent member 20 is closest to the vehicles passenger compartment, and opaque member 22 is closest to the exterior of the vehicle. Translucent member 20 and opaque member 22 are actuated, in incremental fashion, between an open and closed position so that each may rest at any position there between. Further, in the preferred embodiment, translucent member 20 may be coated wit a semitransparent dye or fabric to produce a diffusion effect of incident light. This diffusion may effectively reduce the amount of incident light by a determined percentage.

Also, opaque member 22 serves to "black-out" incident light and may be finished with some designer or advertisement/logo-based finish. Other embodiments are envisioned wherein shade members 20 and 22 may each contain light emitting diodes to produce appealing images within each window frame.

Figure 3:
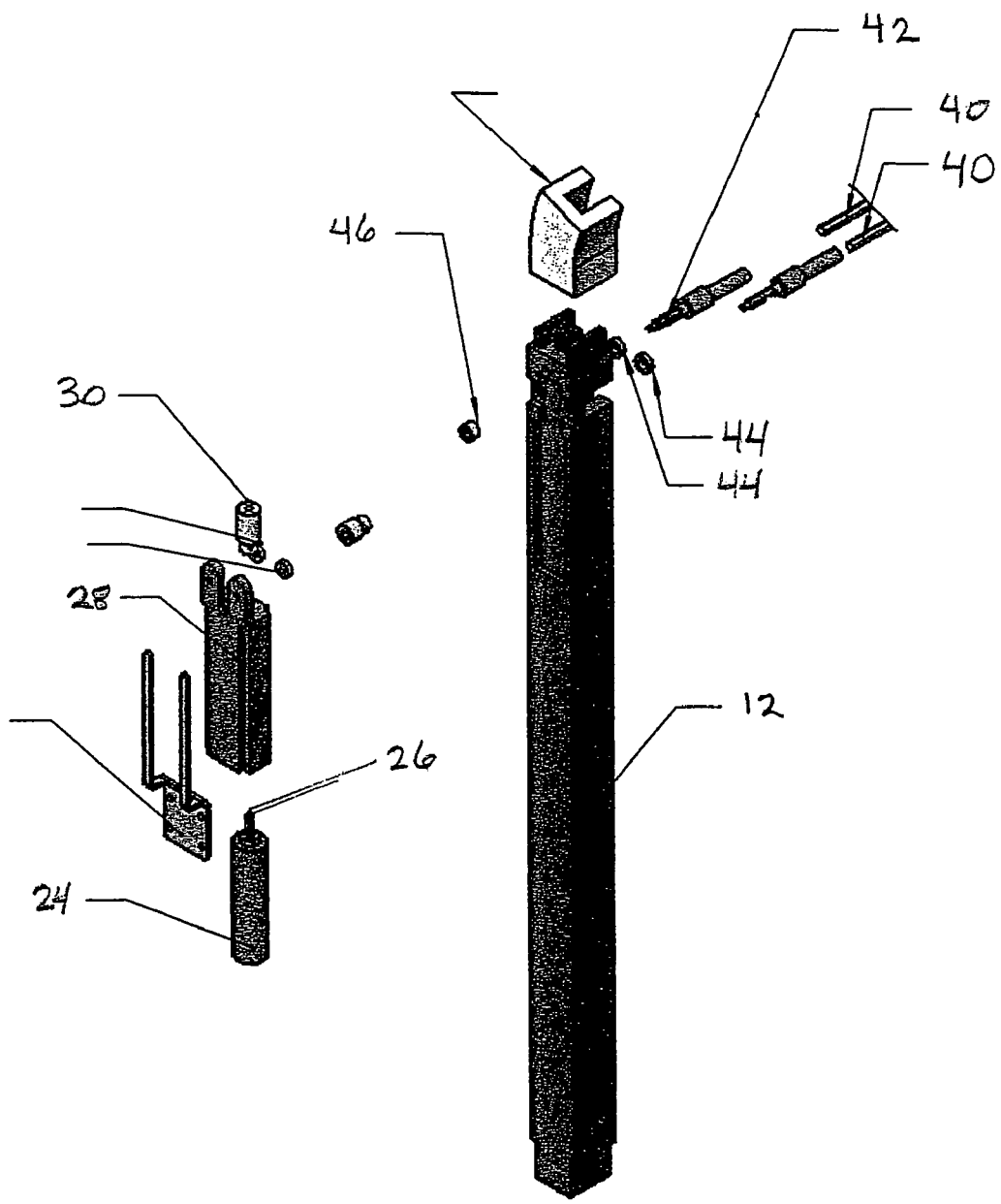
FIG. 3 is an exploded view of a portion of the individual window shade unit of the present invention.
Figure 4:
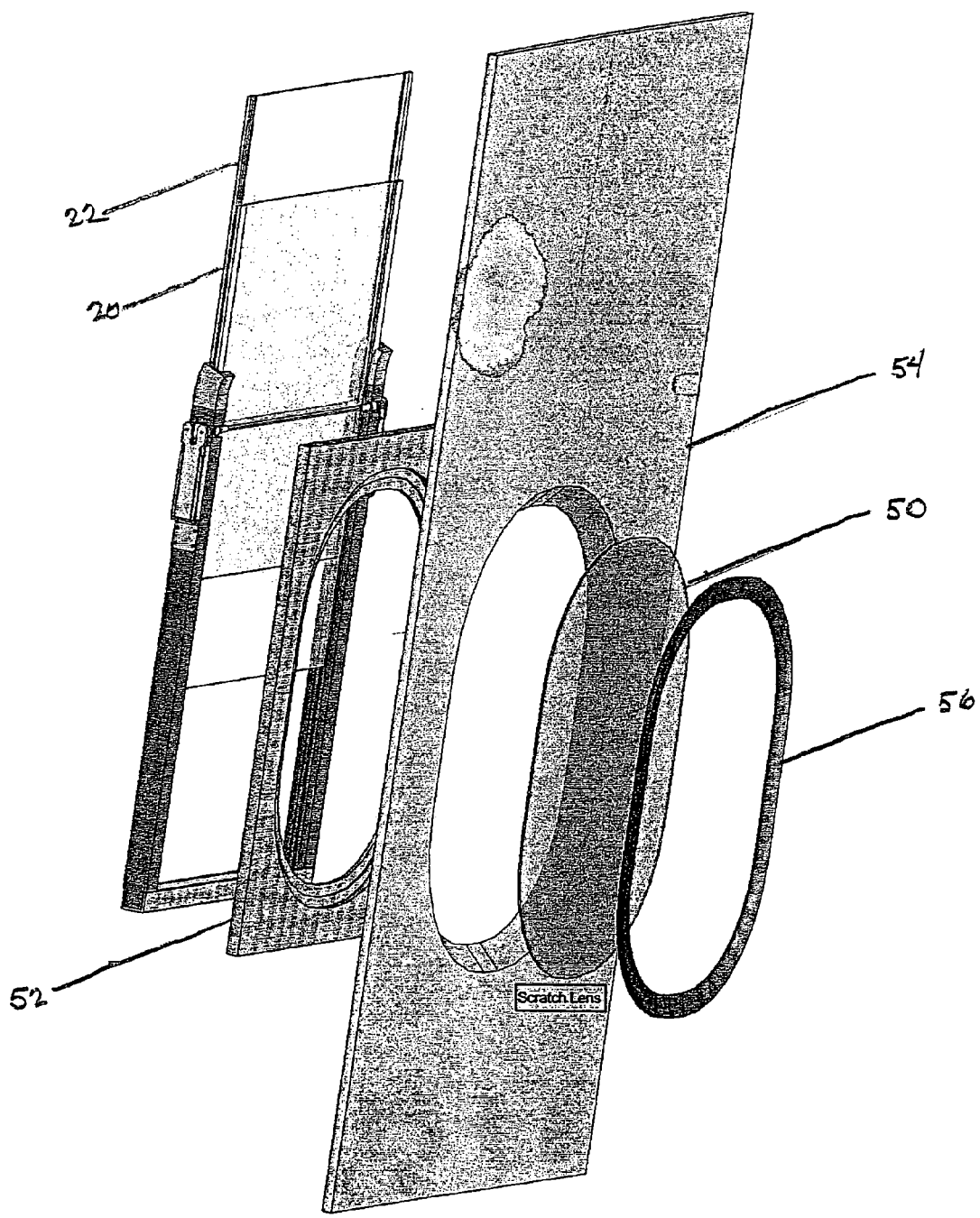
FIG. 4 is an exploded view of an individual window shade unit of the present invention with a scratch lens that is removable from the inside of the aircraft.
Figure 5:
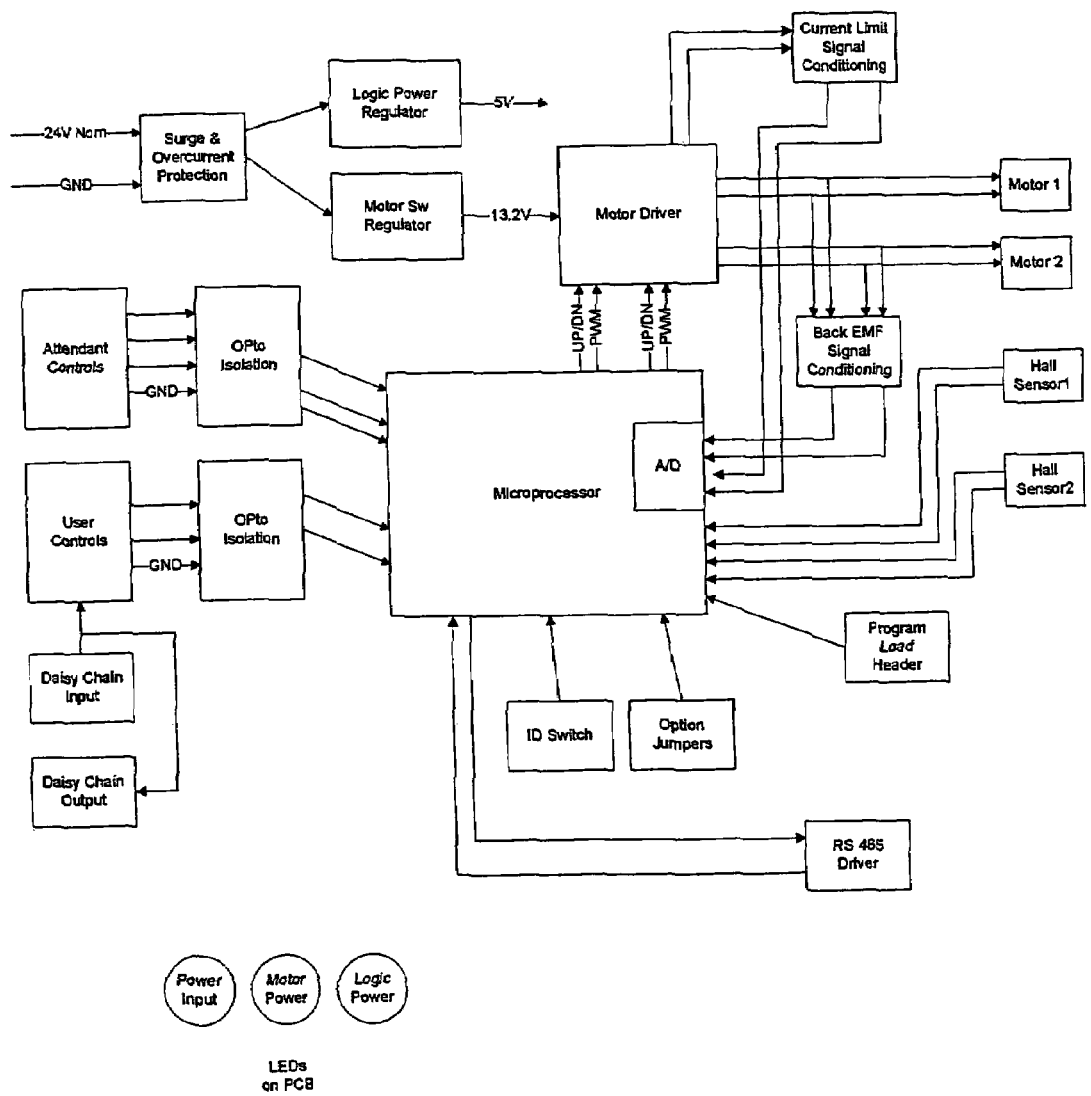
FIG. 5 is a flow chart drawing of the design and function of the control module.
Figure 6:
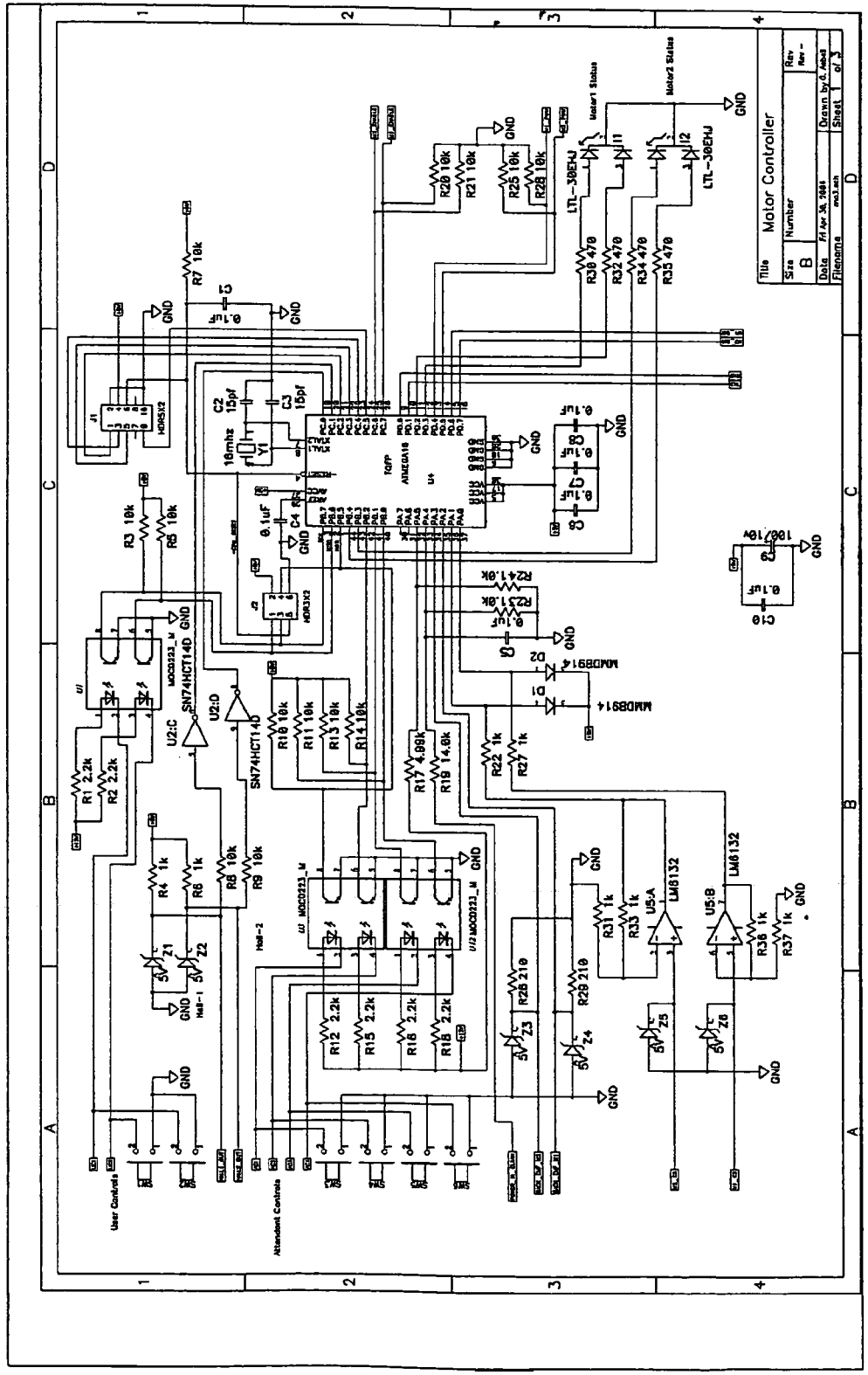
FIG. 6 is a schematic diagram of the window shade unit control module of the present invention.
Figure 7:
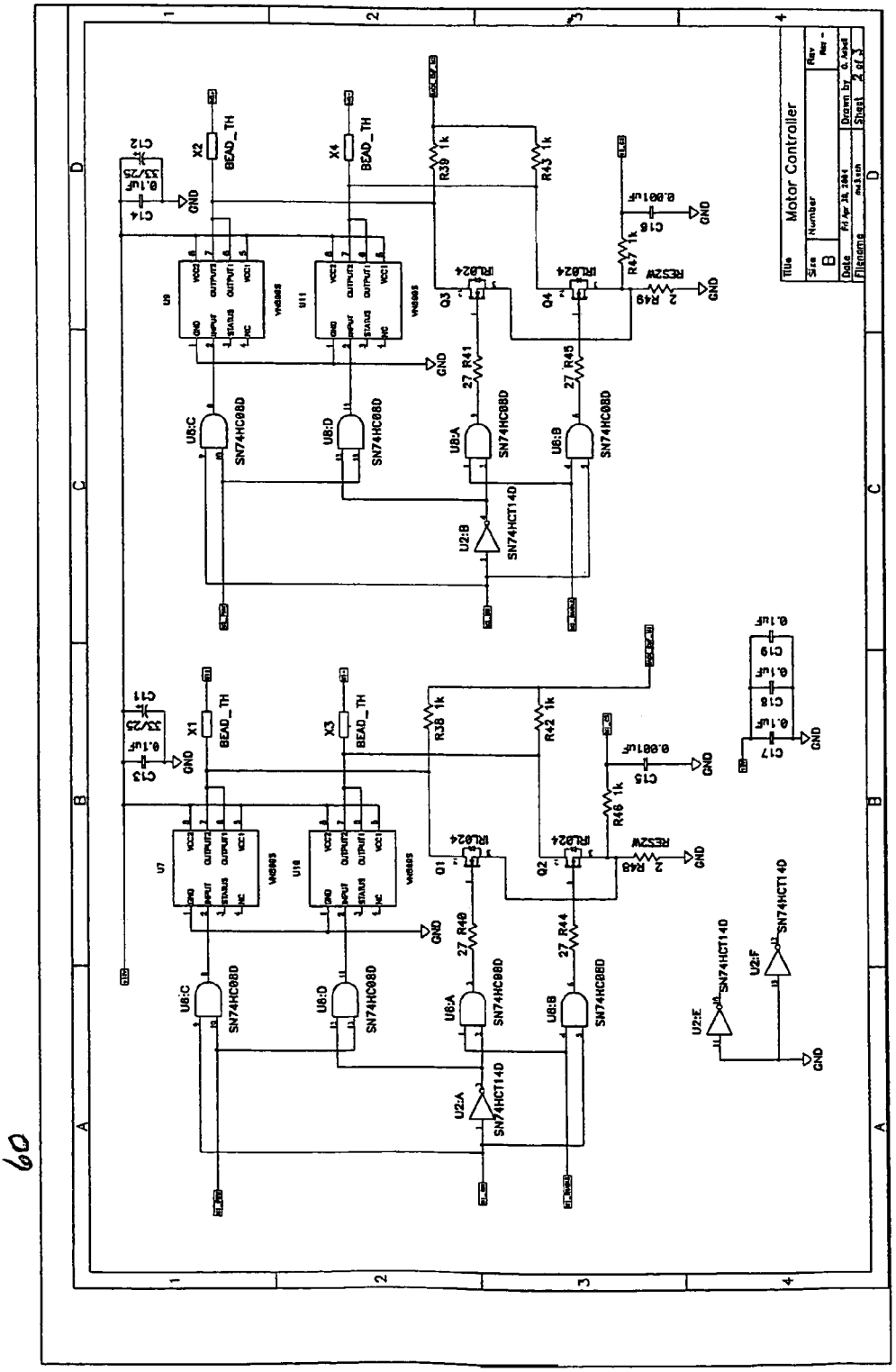
FIG. 7 is a schematic diagram of the window shade unit control module of the present invention.
Figure 8:
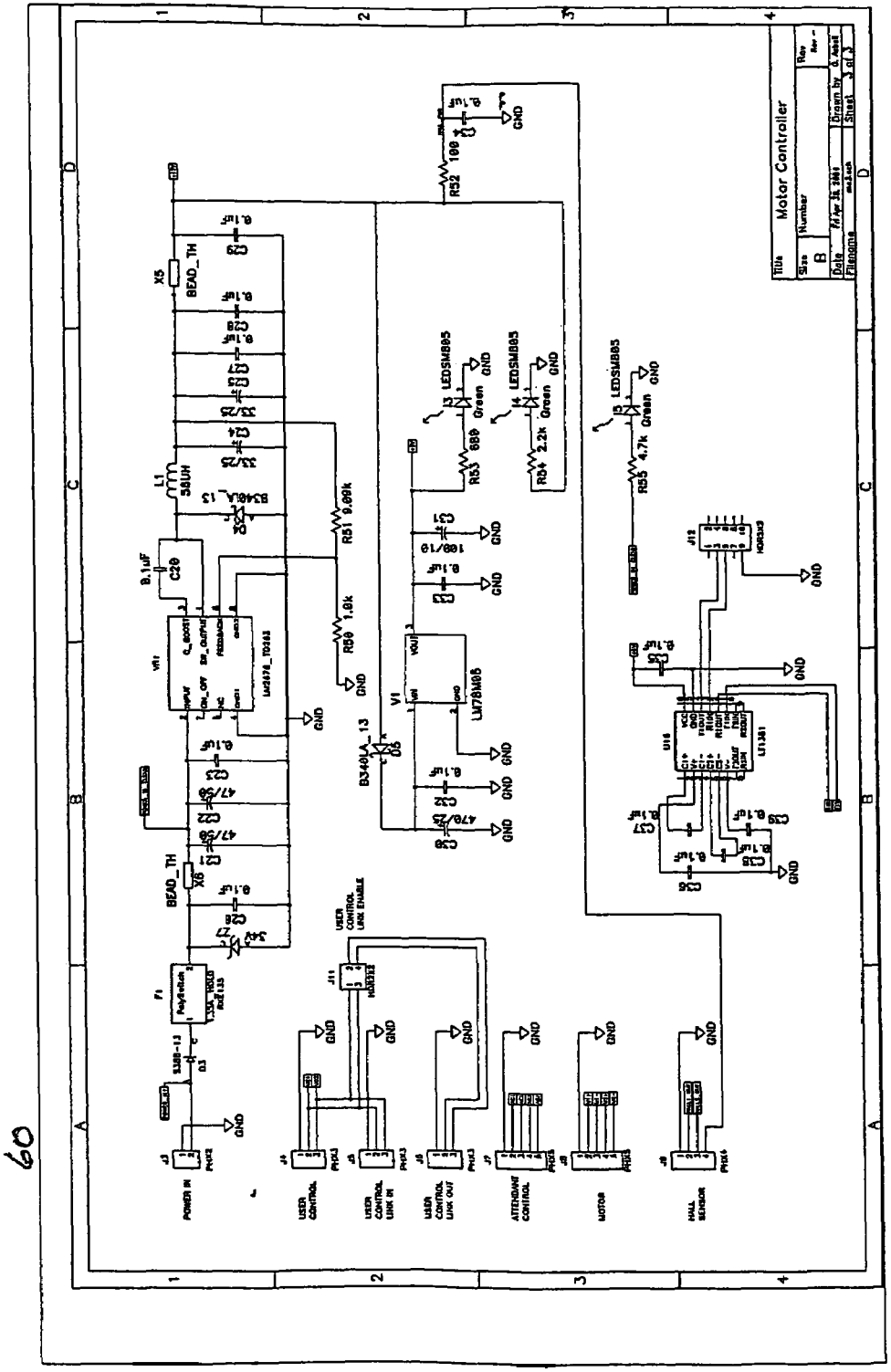
FIG. 8 is a schematic diagram of the window shade unit control module of the present invention

As best seen in FIG. 3, motor 24 is mounted along the exterior face of vertical member 12. Motor 24 is housed within motor housing 28 such that motor drive pin 26 extends from housing 28. Motor 24 is engaged with a gear means 30, which in turn is engaged with a shaft means 40, so that rotation of motor causes a corresponding rotation of the shaft means 40. In the preferred embodiment, gear means 30 is comprised of a worm and worm gear combination. Worm gear combination 30 is engaged with motor 24 at motor drive pin 26, so that as pin 26 rotates about a vertical axis, worm gear combination 30 has an output caused to rotate about a horizontal axis. As seen in both FIG. 2 and FIG. 3, shaft means 40 extends between vertical members 12. At each distal end, shaft 40 is engaged with pin drive 42 so that pin drive 42 and shaft means 40 share the same axis of rotation. In the preferred embodiment, pin 42 has gears that mesh with the rack gears of shade panel members 20 and 22. In the preferred embodiment the rotation of pin 42 and shaft means 40 cause the actuation of shade panel members 20 and 22 between open and closed positions. Each pin drive 42 is engaged with vertical member 12 through inner bearing means 44. Inner bearing means 44 receives pin drive 42 and allows both pin 42 and shaft means 40 to freely rotate while remaining engaged with vertical member 12.Pin drive 42 extends through vertical member 12 so that its distal portion protrudes from the external face of vertical member 12. Pin 42 is engaged with gear means 30 as drive 42 extends through the interior circumference of gear means 30. Outer bearing means 46 receives pin drive 42 and allows both pin 42 and shaft means 40 to freely rotate while remaining engaged with vertical member 12. Referring to FIG. 2 and FIG. 4, scratch lens member 50 is adjacently arranged with translucent member 20 and opaque member 22. AS seen in FIG. 2 the scratch lens member 50 may be located directly on the inboard surface of vertical member 12, or as seen in FIG. 3, scratch lens 50 is further held fixed by removable scratch lens receiver 52 and removable scratch lens retainer member 56. Scratch lens receiver member 52 is aligned with sidewall panel member 54 window hole cut-out to permit scratch lens receiver 52, scratch lens member 50 and scratch lens retainer member 56 to allow scratch lens member 50 to be replaced from the interior of the passenger compartment.

Referring generally to FIG. 5, FIG. 6, FIG. 7, and FIG. 8, individual window shade unit control module 60 is a microprocessor combination that is responsive to both passenger and attendant inputs. Further, in the preferred embodiment, each control module 60 is capable of daisy chaining its input signals to the next down stream controller module 60, this daisy chain ability permits the grouping or association of individual shade units to react to passenger inputs simultaneously, with out the need to have each window shade unit connected to a centralized cabin management computer or controller unit. Performing a number of algorithms, control module 60 performs a number of varying tasks (please see attached code, attached as Appendix A.). These tasks include: interpolating Passenger and attendant inputs, determining the position of each shade panel member, monitoring the proper function of the shade unit, balancing motor speeds and adjusting shade panel member speeds, detecting and logging failures and maintenance requirements, monitoring voltage and current draws and abnormalities, providing failsafe and system protection monitoring, electronically sensing end of travel (full open and full closed) of shade panel members FIG. 20 and FIG. 22, support "daisy chain" down stream communications.

In the preferred embodiment, each control module 60 is able to operate between −20 degrees Celsius and 100 degrees Celsius, 14 volts dc and 34 volts dc, 0 to 100 percent humidity, and −2500 ft. MSL Altitude and 65,000 ft MSL altitude. Further, control module 60 and its components are water resistant and sealed where practicable to avoid moisture damage. Control module 60 employs multi-layered circuit board to ensure a compact foot print.

Each individual window shade unit control module 60 is capable of interfacing with a passenger and attendant input device or interface device, whereby the passenger and or attendant can send instructions to the shade unit. The control module can also communicate with the next downstream controller via daisy chain communication means 80. In the preferred embodiment, communication means 80 is standard wiring composition as know to the art.

Although, the invention has been described with reference to specific embodiments, the description is not meant to be construed in a limited sense. Various modifications of the disclosed embodiment, as well as alternative embodiments of the invention will become apparent to persons skilled in the art upon reference to the description of the invention. It is therefore, contemplated that the appended claims will cover such modifications that fall within the scope of the invention.

I claim:

1. A shade system for a window to control an amount of light entering a surrounding environment from said window comprising:

a frame including a plurality of support members defining a frame perimeter, wherein one of said support members includes an open portion and said plurality of support members includes a series of grooves;

first and second shade panels each disposed within a respective frame groove in slidable relation, wherein said first and second shade panels include different degrees of transparency to control said amount of light from said window and are independently movable relative to said frame;

an actuator to extend said first and second shade panels within said corresponding grooves through said open portion and beyond said frame perimeter and to retract said first and second shade panels within said corresponding grooves through said open portion relative to said frame perimeter; and a controller to receive controls from a first user and to electronically control said actuator to extend and retract said first and second shade panels in accordance with said controls from said first user to position said first and second shade panels relative to each other to provide a desired amount of light from said window.

2. The system of claim 1, wherein said first shade panel is substantially translucent and said second shade panel is substantially opaque, and said controller controls said actuator to position said first and second shade panels relative to each other in accordance with said controls from said first user to control said amount of light from said window.

3. The system of claim 1, wherein said actuator directly engages said first and second shade panels and maintains said first and second shade panels in a locked position absent said controls from said first user to maintain said amount of light from said window.

4. The system of claim 1, wherein said first and second shade panels each include rack gears disposed thereon, and said actuator includes a pinion gear for each of said first and second shade panels that engages a corresponding rack gear to move said first and second shade panels within said corresponding grooves.

5. The system of claim 1, wherein said shade system is mounted within a window envelope of a vehicle and is accessible for maintenance without removal from said vehicle of at least one of said shade system and a vehicle structure.

6. The system of claim 1, wherein said shade system is mounted within a window envelope of a vehicle and is accessible for component replacement without removal from said vehicle of at least one of said shade system and a vehicle structure.

7. The system of claim 1, wherein said controller is linked to at least one other shade system in a daisy-chain fashion to transfer user controls, and wherein each of said linked shade systems controls corresponding first and second shade panels of that shade system in accordance with controls from a user of a designated one of said linked shade systems.

8. The system of claim 7, wherein said linked shade systems operate without use of a centralized controller.

9. The system of claim 1, wherein said controller further receives controls from a second different user and overrides said controls from said first user to control said actuator to extend and retract said first and second shade panels in accordance with said controls from said second user.

10. The system of claim 1, wherein said controller monitors operation of said shade system and detects conditions including at least one of a maintenance need and a failure of said shade system.

11. The system of claim 10, wherein said shade system is mounted on a vehicle with an on-board computer system, and said controller interfaces with said on-board computer system to provide information pertaining to said detected conditions.

12. The system of claim 10, wherein said controller disables said actuator in response to detection of said failure of said shade system.

13. A method of controlling an amount of light entering a surrounding environment from a window via a shade system including a frame including a plurality of support members defining a frame perimeter, wherein one of said support members includes an open portion and said plurality of support members includes a series of grooves with first and second shade panels each disposed within a respective frame groove in slidable relation, an actuator to extend and retract said first and second shade panels and a controller, said method comprising:

(a) independently extending and retracting said first and second shade panels through said support member open portion and relative to said frame perimeter via said actuator electronically controlled by said controller in accordance with controls from a first user to position said first and second shade panels relative to each other to provide a desired amount of light from said window, wherein said first and second shade panels include different degrees of transparency to control said amount of light from said window.

14. The method of claim 13, wherein step (a) further includes:

(a.1) maintaining said first and second shade panels in a locked position absent said controls from said first user to maintain said amount of light from said window.

15. The method of claim 13, wherein said first and second shade panels each include rack gears disposed thereon and said actuator includes a pinion gear for each of said first and second shade panels, and step (a) further includes:

(a.1) engaging a rack gear of said first and second shade panels with a corresponding pinion gear to move said first and second shade panels within said corresponding grooves.

16. The method of claim 13, wherein said shade system is mounted within a window envelope of a vehicle, and said method further includes:

(b) accessing said shade system for one of maintenance and component replacement without removal from said vehicle of at least one of said shade system and a vehicle structure.

17. The method of claim 13, wherein said controller is linked to at least one other shade system in a daisy-chain fashion, and step (a) further includes:

(a.1) transferring user controls between said linked shade systems; and (a.2) controlling corresponding first and second shade panels of each of said linked shade systems in accordance with controls from a user of a designated one of said linked shade systems.

18. The method of claim 17, wherein step (a.2) further includes:

(a.2.1) controlling each of said linked shade systems without use of a centralized controller.

19. The method of claim 13, wherein controls are received from a second different user, and step (a) further includes:

(a.1) overriding said controls from said first user and controlling said actuator to extend and retract said first and second shade panels in accordance with said controls from said second user.

20. The method of claim 13, wherein said method further includes:

(b) monitoring operation of said shade system, via said controller, and detecting conditions including at least one of a maintenance need and a failure of said shade system.

21. The method of claim 20, wherein said shade system is mounted on a vehicle with an on-board computer system, and step (b) further includes:

(b.1) interfacing said controller with said on-board computer system to provide information pertaining to said detected conditions.

22. The method of claim 20, wherein step (b) further includes:

(b.1) disabling said actuator in response to detection of said failure of said shade system.

23. A shade system for a window to control an amount of light entering a surrounding environment from said window comprising:

a frame;

first and second shade panels each disposed within said frame in slidable relation, wherein said first and second shade panels include different degrees of transparency to control said amount of light from said window and are independently movable relative to said frame;

an actuator to move said first and second shade panels; and a controller to electronically control said actuator to move said first and second shade panels in accordance with controls from a user to position said first and second shade panels relative to each other to provide a desired amount of light from said window, wherein said controller is linked to at least one other shade system in a daisy-chain fashion to transfer user controls, and wherein each of said linked shade systems controls corresponding first and second shade panels of that shade system in accordance with controls from a user of a designated one of said linked shade systems.

* * * * *